(12) United States Patent
Kraft et al.

(10) Patent No.: US 8,696,201 B2
(45) Date of Patent: Apr. 15, 2014

(54) DEVICE AND METHOD FOR CALIBRATING AN X-RAY DETECTOR, CALIBRATION APPARATUS AND X-RAY APPARATUS

(75) Inventors: Edgar Kraft, Erlangen (DE); Björn Kreisler, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 232 days.

(21) Appl. No.: 13/293,179

(22) Filed: Nov. 10, 2011

(65) Prior Publication Data

US 2012/0128131 A1  May 24, 2012

(30) Foreign Application Priority Data

Nov. 19, 2010 (DE) .......................... 10 2010 044 176

(51) Int. Cl.
*G01D 18/00* (2006.01)

(52) U.S. Cl.
USPC ............................................. 378/207; 378/5

(58) Field of Classification Search
USPC ................................. 378/19, 207, 5
See application file for complete search history.

(56) References Cited

U.S. PATENT DOCUMENTS

| 5,376,803 | A | 12/1994 | Johnson et al. |
| 6,043,486 | A | 3/2000 | Hossain |
| 6,603,119 | B1 | 8/2003 | Giannuzzi |
| 7,474,730 | B2 | 1/2009 | Puusaari |
| 2008/0233652 | A1* | 9/2008 | Kreyenschmidt et al. ........ 436/8 |
| 2011/0012014 | A1* | 1/2011 | Livne et al. ................ 250/252.1 |

FOREIGN PATENT DOCUMENTS

| DE | 19728930 A1 | 1/1999 |
| DE | 102005054443 A1 | 5/2007 |
| DE | 112009000004 T5 | 7/2010 |
| WO | WO 2009122317 A2 | 10/2009 |

\* cited by examiner

*Primary Examiner* — Hoon Song
(74) *Attorney, Agent, or Firm* — Harness, Dickey & Pierce, P.L.C.

(57) ABSTRACT

A device and a method are disclosed, for energetic calibration of a photon-counting X-ray radiation detector by way of X-ray fluorescence radiation. The device includes a plurality of specifically selected elements, of which each element, upon being irradiated with electrons or with high-energy radiation, emits photons of X-ray fluorescence radiation of at least one specific or characteristic energy. The photons of X-ray fluorescence radiation of the at least one specific or characteristic energy are then useable or are used for energetic calibration of the photon-counting X-ray radiation detector. A calibration apparatus and an X-ray apparatus are also disclosed, which include such a device.

22 Claims, 4 Drawing Sheets

DEVICE AND METHOD FOR CALIBRATING AN X-RAY DETECTOR, CALIBRATION APPARATUS AND X-RAY APPARATUS

PRIORITY STATEMENT

The present application hereby claims priority under 35 U.S.C. §119 on German patent application number DE 10 2010 044 176.7 filed Nov. 19, 2010, the entire contents of which are hereby incorporated herein by reference.

FIELD

At least one embodiment of the invention generally relates to a device and/or a method for energetic calibration of a photon-counting X-ray radiation detector. At least one embodiment of the invention further generally relates to a calibration apparatus and/or to an X-ray apparatus which include a device of that type.

BACKGROUND

Typically, photon-counting detectors for detecting X-ray radiation are pixel-based X-ray detectors made from a direct-converting semiconductor material which are capable of counting and/or detecting individual photons of X-ray radiation that are incident on pixels of the X-ray radiation detector in an energy-resolving manner in that energy thresholds assigned to the pixels have been specified. When a photon of X-ray radiation strikes a pixel or penetrates the semiconductor material of the X-ray radiation detector, the photon interacts with the semiconductor material, whereupon free electrons are generated which, separated by an electric field, generate a charge pulse corresponding to the energy of the photon at electrodes of the pixel. The charge pulse is converted by way of signal-processing electronics comprising e.g. a preamplifier into a measurement voltage which is compared with threshold voltages representing different energy levels. In this way a specific energy can be assigned to a detected photon and the photon can be counted accordingly.

In order to be able to count photons of X-ray radiation striking such an X-ray radiation detector in an energy-resolved manner in the way described, the detector must first be calibrated energetically. The calibration is necessary for each measurement channel of the detector having a pixel and signal-processing electronics. In this case characteristic variables that describe the specific behavior of the detector material and of the signal-processing electronics are determined for each measurement channel. Setting the threshold voltages with maximum precision is critical in order to achieve a homogeneous response behavior of the detector and consequently e.g. to obtain optimally artifact-free and low-drift CT images when the detector is used in computed tomography applications.

During the calibration charge pulses of known magnitude corresponding to energies of photons of X-ray radiation are typically injected into the pixels and the response behavior of the measurement channel having the respective pixel is analyzed. From the analysis there results for each measurement channel a relation between injected pulses of a specific charge magnitude and the values of the measured voltage, such that threshold voltages can be specified in each case for the respective measurement channel for different charge pulse magnitudes or, as the case may be, energies of photons of X-ray radiation.

The calibration can be carried out electronically or using X-ray radiation. With electronic calibration the charge pulses are generated for example by way of clocked current sources or by way of the rapid charging and discharging of capacitances. For this purpose, however, the sources for generating the charge pulses must first be calibrated themselves. Furthermore, taking the specific behavior of the detector material into account during the charge collection is problematic in the case of electronic calibration.

There are various approaches with regard to calibration using X-ray radiation. According to a first approach the detector is calibrated based on the measurement or determination of the specific endpoint energy of the photons of different X-ray spectra. In practice, however, it proves difficult or complicated to detect the endpoint of the different X-ray spectra for the calibration in each case by way of the X-ray radiation detector.

A further possibility is to use radioactive sources that emit photons of X-ray radiation having a clearly defined energy. However, using radioactive sources is problematic in relation to the handling, the radiation shielding, of the available energies and of the flow of photons of X-ray radiation that can be generated, the latter because the sources become weaker with increasing age.

In theory a synchrotron could also be used for the calibration, though in practice this is ruled out on the grounds of the high degree of technical complexity and the only very limited availability.

SUMMARY

In at least one embodiment, the invention discloses a device and a method for energetic calibration of a photon-counting X-ray radiation detector as well as a calibration apparatus and an X-ray apparatus, wherein X-ray fluorescence radiation is used for the calibration.

At least one embodiment of the invention is directed to a device for energetic calibration of a photon-counting X-ray radiation detector by way of X-ray fluorescence radiation, which device comprises a plurality of specifically selected chemical elements, of which each chemical element, upon being irradiated with electrons or high-energy radiation preferably of polychromatic X-ray radiation, emits photons of X-ray fluorescence radiation of at least one specific or characteristic energy, which photons of X-ray fluorescence radiation of the at least one specific or characteristic energy can be used for energetic calibration of the photon-counting X-ray radiation detector.

By X-ray fluorescence is to be understood the emission of characteristic secondary or fluorescing photons of X-ray radiation by chemical elements that have been excited to emission as a result of being irradiated with electrons or high-energy radiation, e.g. polychromatic X-ray radiation. By way of the energy of an electron or of the high-energy radiation an electron of the innermost shell, the K-shell, is expelled from the atom of the chemical element. The resulting gap is immediately filled by an electron from a higher shell, the difference in energy being released in the form of X-ray fluorescence radiation. Since the energy levels of the K-shells or the energetic position of the K-edges of the chemical elements are different, the resulting X-ray fluorescence radiation is also characteristic of each chemical element.

In order to simplify the calibration of a photon-counting X-ray radiation detector, in at least one embodiment the inventors therefore propose specifically selecting a plurality of chemical elements and making these available in a device as a unit or structural unit for the calibration of the photon-counting X-ray radiation detector. If the device is by preference irradiated by way of polychromatic X-ray radiation, the chemical elements of the device emit only photons of X-ray fluorescence radiation of specific energies which are dependent on the different energetic positions of the K-edges of the selected chemical elements and can be used for the calibration. The device offers the advantage that it is easy to handle, i.e. it is not necessary to excite the chemical elements used for the calibration individually and sequentially in order to emit X-ray fluorescence radiation, but rather this can be realized simultaneously through the known selection of the elements and their known emission of photons of X-ray fluorescence radiation of specific energies.

According to a variant of at least one embodiment of the invention, the different elements of the device are selected such that the different specific or characteristic energies of the photons of X-ray fluorescence radiation that are emitted by the different elements can be unequivocally distinguished from one another. In particular the selection is made in such a way that the energy resolution of the X-ray radiation detector enables the photons of different energy to be counted separately.

In principle virtually all of the chemical elements of the periodic table between chromium and lead can be used for the calibration. As already mentioned, these should, however, be selected specifically as a function of the position of their K-edge and consequently for purposes of energetic discrimination. For example, the following selection of chemical elements has proven suitable for the device, the elements being listed together with their abbreviation according to the periodic table and the rounded energy of their K-edge:

| | |
|---|---|
| Molybdenum | (Mo, K~20 keV) |
| Tin | (Sn, K~29 keV) |
| Iodine | (I, K~33 keV) |
| Gadolinium | (Gd, K~50 keV) and |
| Tungsten | (W, K~70 keV). |

A list of the chemical elements containing the position of their K-edge can be found, for example, by following the internet link http://physics.nist.gov/cgi-bin/XrayTrans/search.pl?download=tab&trans=Kedge&lower=5000&upper=100000&units=eV, the entire contents of which are hereby incorporated by reference herein.

According to an embodiment variant of the invention, the specifically selected chemical elements of the device are present in powder form and/or as granulate. The powder form or granulate may have been produced by grinding, for example.

According to another embodiment variant of the invention, the specifically selected chemical elements of the device, in particular when they are present in powder form and/or as granulate, are mixed with one another. Preferably the mix consisting of the specifically selected chemical elements is mechanically stabilized in that, according to a variant of the invention, it is pressed, e.g. hot-pressed. Alternatively the mix can also be arranged, if necessary only after mechanical stabilization, in or on a carrier material, in which case one of the specifically selected chemical elements itself can act as the carrier material.

According to one embodiment of the invention, the specifically selected chemical elements form a preferably solid alloy. The device is accordingly an alloy of the specifically selected chemical elements.

According to an alternative embodiment of the invention, the specifically selected chemical elements are arranged vertically stacked on top of one another in layers. The device can accordingly have a multilayer sequence of thin layers, wherein each layer is constructed from one of the specifically selected chemical elements. Layers of said kind can be created for example by anodization, wet deposition, sputtering and/or spray deposition. It must be taken into account that the layer thicknesses are produced in such a way that the specifically selected chemical elements of the individual layers can be excited to emission by means of electrons or high-energy radiation and that the generated photons of X-ray fluorescence radiation can pass through to the outside, i.e. can escape from the device.

The specifically selected chemical elements may, however, also be arranged adjacent to one another on a carrier material for example in a matrix, comb and/or meander shape.

Preferably the device is embodied as plate-shaped or parallelipiped-shaped.

An embodiment of the present invention is also achieved by way of a calibration apparatus for energetic calibration of a photon-counting X-ray radiation detector, which calibration apparatus has a source of electrons or high-energy radiation, e.g. an X-ray tube and one of the devices described hereintofore.

An embodiment of the present invention is furthermore achieved by way of an X-ray apparatus having a source of polychromatic X-ray radiation, a photon-counting X-ray radiation detector and one of the devices described hereintofore. The X-ray apparatus can be an X-ray machine or specifically a computed tomography device having at least one X-ray tube as a source of polychromatic X-ray radiation. Arranging a device for energetic calibration of a photon-counting X-ray radiation detector in an X-ray apparatus enables the photon-counting X-ray radiation detector to be calibrated whenever necessary, at service intervals for example, without the need to remove the detector from the X-ray apparatus. The device is preferably arranged in the X-ray machine in such a way that it can optionally be positioned in the beam path of the X-ray tube so that the desired X-ray fluorescence radiation can be generated for calibration purposes.

An embodiment of the present invention is achieved in addition by way of a method for energetic calibration of a photon-counting X-ray radiation detector using one of the devices described hereintofore, wherein the device is moved into the beam path of a source of electrons or high-energy radiation and wherein the X-ray fluorescence radiation exiting the device is used in the form of emitted photons of X-ray fluorescence radiation of specific or characteristic energies for energetic calibration of the photon-counting X-ray radiation detector.

BRIEF DESCRIPTION OF THE DRAWINGS

Example embodiments of the invention are illustrated in the attached schematic drawings, in which.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments.

The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Figure 1:
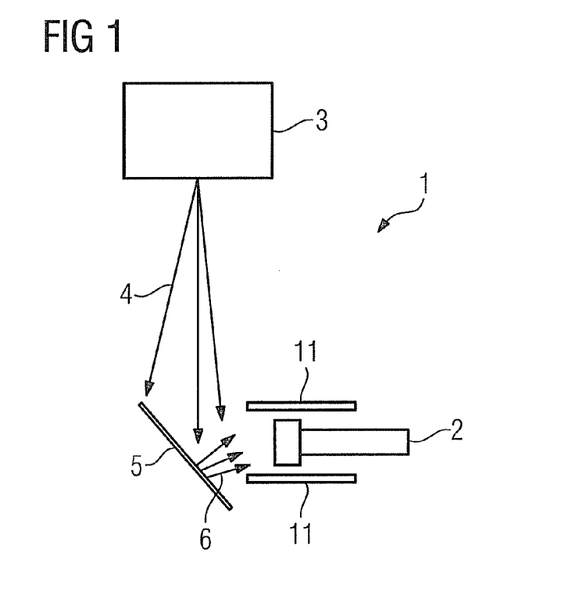
FIG. 1 shows a calibration apparatus.

FIG. 1 shows a calibration apparatus 1 for energetic calibration of a pixel-containing, photon-counting X-ray radiation detector 2 according to an embodiment of the present invention which in the case of the present example embodiment of the invention has, as its source of high-energy radiation, an X-ray tube 3 which can emit polychromatic X-ray radiation 4.

The calibration apparatus 1 also includes a device 5 for energetic calibration of the photon-counting X-ray radiation detector 2 by means of X-ray fluorescence radiation 6. In the case of the present example embodiment of the invention, the device 5 is embodied as plate-shaped and has a plurality of specifically selected chemical elements, of which each element emits photons of X-ray fluorescence radiation 6 of at least one specific or characteristic energy upon being irradiated with the polychromatic X-ray radiation 4 of the X-ray tube 3, which energies can be used for energetic calibration of the photon-counting X-ray radiation detector 2.

In the case of the present example embodiment of the invention, the device 5 comprises the chemical elements molybdenum (Mo, K~20 keV), tin (Sn, K~29 keV), iodine (I, K~33 keV), gadolinium (Gd, K~50 keV) and tungsten (W, K~70 keV). The elements can be combined in different forms to realize the device 5 as a plate-shaped structural unit 5.

If the cited specifically selected chemical elements Mo, Sn, I, Gd and W are present in powder form and/or as granulate, they are homogeneously mixed with one another and then preferably pressed together, hot-pressed for example, to provide mechanical stabilization and/or arranged in or on a carrier material, e.g. a plastic, an epoxy resin or aluminum, in order to form the device 5. The carrier material is preferably a material which, when irradiated with polychromatic X-ray radiation, itself emits no X-ray fluorescence radiation in the range of the energies that are to be calibrated. As already mentioned, the carrier material can be for example a plastic or a plastic plate on which the pressed-together selected chemical elements are arranged to provide mechanical or additional mechanical stabilization. The carrier material can, however, also be a type of housing or enclosure, made for example out of a plastic, in which the selected chemical elements are arranged, the selected chemical elements in this case not necessarily having to be pressed together. In principle it is also possible for one of the specifically selected chemical elements itself to act as the carrier material.

Alternatively a mechanically stable device 5 can also be obtained by the specifically selected chemical elements Mo, Sn, I, Gd and W forming a preferably solid homogeneous alloy.

Figure 2:
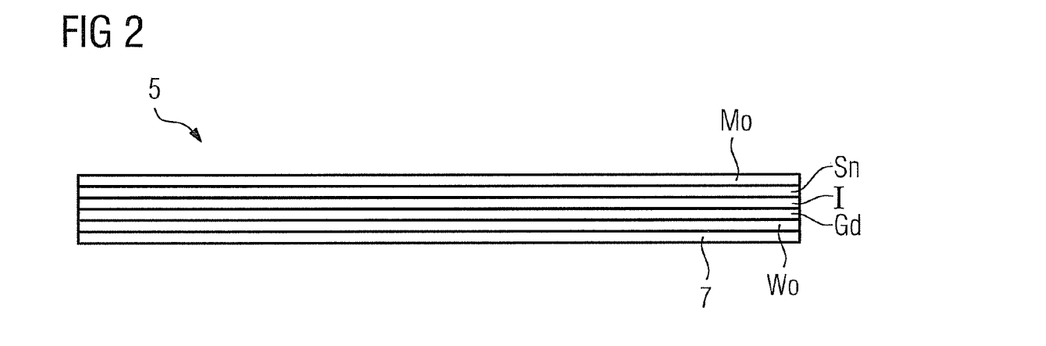
FIG. 2-FIG. 5 show different devices for energetic calibration of a photon-counting detector.

A further alternative for obtaining a mechanically stable device 5 consists in arranging the specifically selected chemical elements Mo, Sn, I, Gd and W in thin layers having a thickness or strength of approx. 5 to 500 µm on top of one another, as shown schematically in FIG. 2 in a side view of the device 5. In the case of the present example embodiment of the invention the layers are arranged on a carrier plate 7, which in turn can be formed for example from a plastic, an epoxy resin or aluminum. Depending on each selected chemical element, the layers can be or can have been produced by anodization, wet deposition, sputtering and/or spray deposition. The individual layers of the specifically selected chemical elements are produced with such a thickness or strength that the specifically selected chemical elements of the individual layers are excited by way of the polychromatic X-ray radiation 4 to emit X-ray fluorescence radiation 6 and that the generated photons of X-ray fluorescence radiation 6 can escape outward, i.e. out of the device 5. The intention in this case is that the chemical elements of the thin layers are to be irradiated in particular simultaneously with polychromatic X-ray radiation 4 and that they emit X-ray fluorescence radiation 6 in the direction of the photon-counting detector 2.

Figure 3:
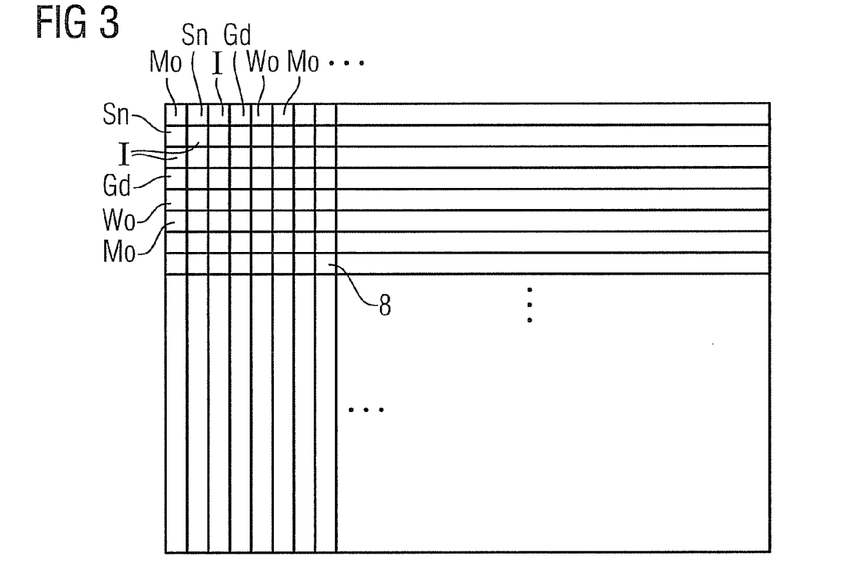
Figure 4:
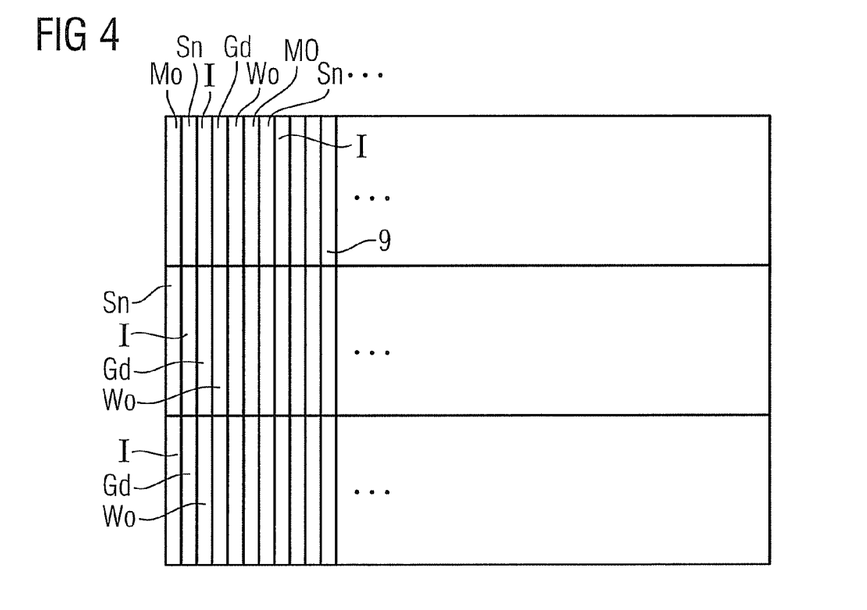
Figure 5:
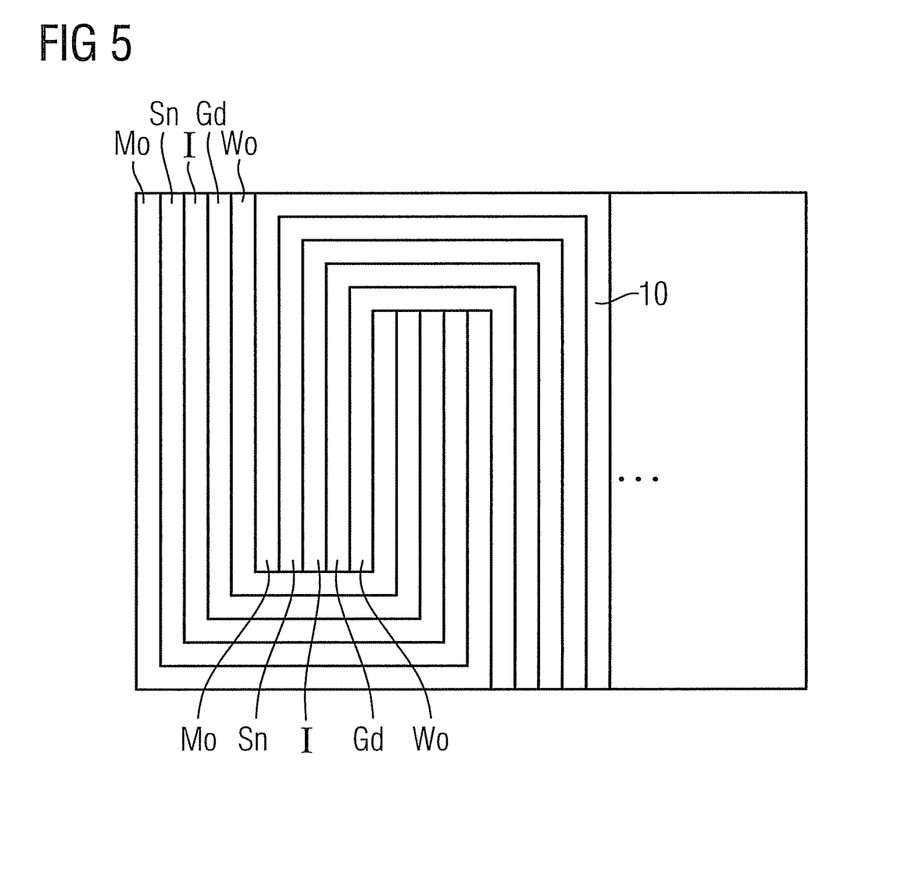

FIGS. 3 to 5 are plan views showing further alternatives for building the device 5. According to FIG. 3 the specifically selected chemical elements Mo, Sn, I, Gd and W are arranged in a matrix shape, according to FIG. 4 in a comb shape, and according to FIG. 5 in a meander shape, in each case on a carrier material not shown in the figures. The chemical elements are in this case arranged two-dimensionally relative to one another in a compact space, where a square of the matrix has a surface area of approx. 1 to 10 mm$^2$ or where a comb line 9 or a meander line 10 has a width of approx. 0.1 to 10 mm.

Irrespective of the shape in which the device 5 comprising the specifically selected chemical elements Mo, Sn, I, Gd, W is embodied, the chemical elements are always arranged as homogeneously as possible over the device 5, whether by mixing or by spatial disposition relative to one another, such that upon being excited by means of the polychromatic X-ray radiation 4, ideally seen over the entire device 5, photons of X-ray fluorescence radiation 6 of the specific, characteristic energies, in other words of the energies of ~20 keV (Mo), ~29 keV (Sn), ~33 keV (I), ~50 keV (Gd) and ~70 keV (W), are emitted by the device 5 in the direction of the X-ray radiation detector 2 requiring to be calibrated. In this way the photon-counting X-ray radiation detector 2 requiring to be calibrated is completely illuminated by way of the photons of X-ray fluorescence radiation 6, i.e. every pixel or, as the case may be, every measurement channel of the X-ray radiation detector 2 comprising a pixel and downstream-connected signal-processing electronics is struck by photons of X-ray fluorescence radiation 6 of each of the available energies of ~20 keV (Mo), ~29 keV (Sn), ~33 keV (I), ~50 keV (Gd) and ~70 keV (W) for calibration purposes.

Furthermore the chemical elements Mo, Sn, I, Gd and W were specifically selected for the purpose of forming the device 5 in such a way that the different specific or characteristic energies ~20 keV (Mo), ~29 keV (Sn), ~33 keV (I), ~50 keV (Gd) and ~70 keV (W) of the photons of X-ray fluorescence radiation 6 emitted by the chemical elements Mo, Sn, I, Gd and W can be unequivocally distinguished from one another for calibration purposes. However, the device 5 does not necessarily have to include all of the five chemical elements described. For example, one of the elements iodine (I) or tin (Sn) can be omitted, since their K-edge energies lie relatively close to each other.

In order to calibrate the X-ray radiation detector 2, the latter is arranged in the calibration apparatus 1. The device 5 is positioned or arranged in the beam path of the polychromatic X-ray radiation 4 being emitted from the X-ray source 2 in such a way that the polychromatic X-ray radiation preferably illuminates the entire device 5, i.e. that preferably the entire device 5 is irradiated with polychromatic X-ray radiation. As a result of being excited by way of the polychromatic X-ray radiation 4 the chemical elements Mo, Sn, I, Gd and W emit photons of X-ray fluorescence radiation 6 of a characteristic energy ~20 keV (Mo), ~29 keV (Sn), ~33 keV (I), ~50 keV (Gd) and ~70 keV (W) in each case, which energies are used for energetic calibration of the photon-counting X-ray radiation detector 2. In the case of the present example embodiment of the invention the X-ray radiation detector 2 is assigned shields 11, in particular in order to shield against photons scattered due to the Compton scattering effect.

Because the energies are present discretely, each measurement channel of the X-ray radiation detector 2 can be calibrated by relating the different voltages measured in a measurement channel to the known energies so that threshold voltages can be specified for each measurement channel and can be measured in an energy-resolved manner by means of the X-ray radiation detector 2 calibrated in this way. The calibration can advantageously be carried out in one operation, since the individual elements emitting X-ray fluorescence radiation are excited to emission essentially simultaneously and not sequentially. Replacing the individual X-ray fluorescence emitters, i.e. structures containing only one chemical element which emits photons of X-ray fluorescence radiation of a characteristic energy, is accordingly not necessary. This results in a time saving. Furthermore the calibration can be automated.

Figure 6:
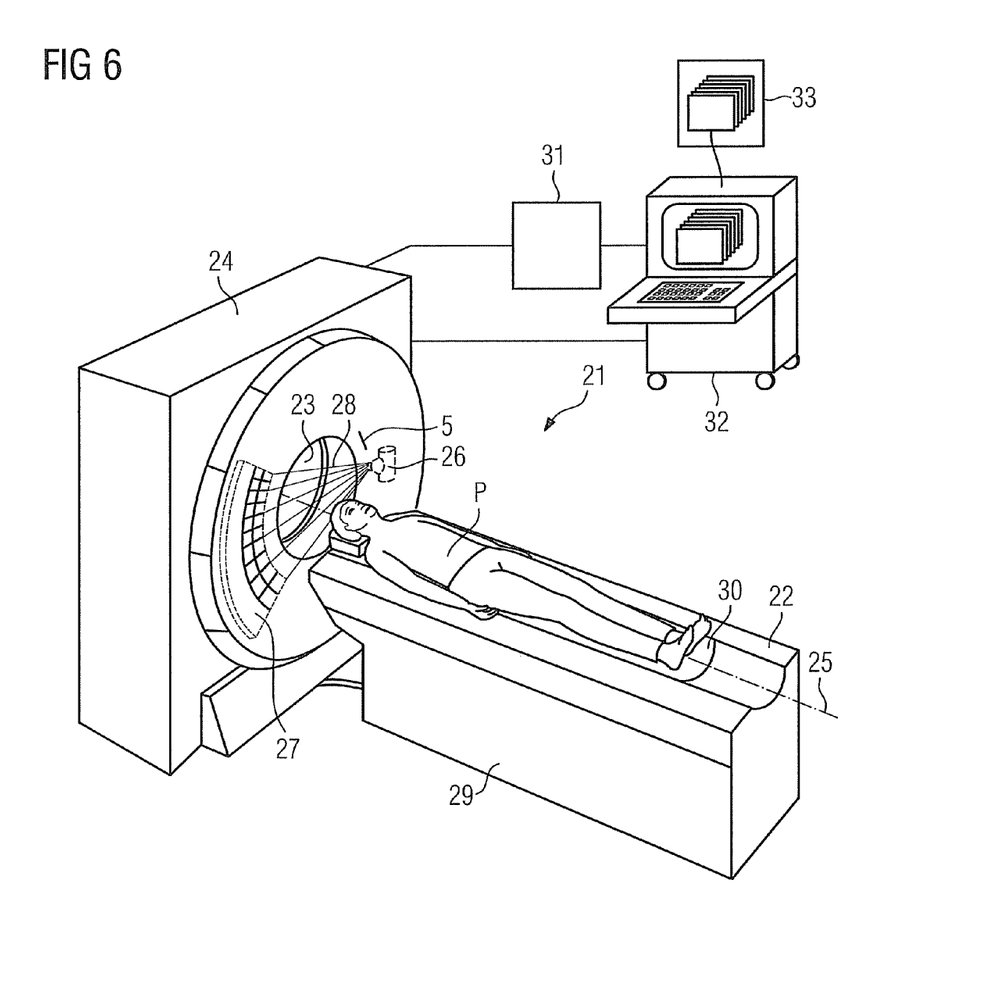
FIG. 6 shows a computed tomography device.

FIG. 6 shows an X-ray apparatus in the form of a computed tomography device 21 which includes a device 5 for energetic calibration of a photon-counting X-ray radiation detector.

The X-ray computed tomography device 21 also comprises a patient couch 22 for positioning a patient P to be examined, as well as a gantry 24 having a tube-detector system mounted so as to be rotatable around a system axis 25. The tube-detector system has, disposed opposite each other, an X-ray tube 26 and a photon-counting X-ray radiation detector 27. During operation polychromatic X-ray radiation 28 is emitted by the X-ray tube 26 in the direction of the detector 27 and measured by way of the latter.

The patient couch 22 has a couch pedestal 29 on which is arranged a patient positioning plate 30 provided for the actual positioning of the patient P. The patient positioning plate 30 is adjustable relative to the couch pedestal 29 such that the patient positioning plate 30 can be introduced with the patient P into the bore 23 of the gantry 24 for the purpose of recording 2D X-ray projections of the patient P, e.g. in a spiral scan. The computational processing of the 2D X-ray projections or, as the case may be, the reconstruction of a volume dataset of a body region of the patient P based on the 2D X-ray projections is performed by means of a schematically represented image processor 31 of the X-ray computed tomography device 21.

The device 5 is assigned to the rotatably mounted tube-detector system in such a way that the device 5 can optionally be arranged in the beam path of the polychromatic X-ray radiation 28 emitted by the X-ray tube 26. Providing the device 5 in the computed tomography device 21 means that the photon-counting X-ray radiation detector 27 can be subjected to a new energetic calibration by way of X-ray fluorescence radiation for example during a routine service that is to be carried out on the computed tomography device 21, without the need to disassemble the detector 27 and calibrate it for example in a calibration apparatus 1. For this purpose a control and computing unit 32 of the computed tomography device 21 can be provided with software 33 implementing the calibration method, with the result that the energetic calibration of the detector 27 can be performed in an automated or semi-automated manner during the service.

In contrast to the example embodiment shown in FIG. 1, a different source of high-energy radiation or a source of electrons may alternatively be provided instead of the X-ray tube 3.

The device 5 can also be embodied as parallelepiped-shaped, cube-shaped, round or in some other shape, provided that this is advantageous for illumination or irradiation by means of electrons or by way of high-energy radiation as well as for emission of X-ray fluorescence radiation.

The device 5 may also include other chemical elements than those described hereintofore.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A device for energetic calibration of a photon-counting X-ray radiation detector by way of X-ray fluorescence radiation, the device comprising:
a plurality of specifically selected elements, each of the plurality of specifically selected elements, upon being irradiated with electrons or with high-energy radiation, emitting photons of X-ray fluorescence radiation of at least one specific or characteristic energy, the emitted photons of X-ray fluorescence radiation of the at least one specific or characteristic energy being usable for energetic calibration of the photon-counting X-ray radiation detector.

2. The device as claimed in claim 1, wherein different ones of the plurality of elements are selected such that the different specific or characteristic energies of the photons of X-ray fluorescence radiation emitted by the different elements are unequivocally distinguishable from one another.

3. The device as claimed in claim 1, wherein the elements are present in at least one of powder form and as granulate.

4. The device as claimed in claim 1, wherein the elements are mixed with one another.

5. The device as claimed in claim 1, wherein the elements are at least one of pressed together and arranged in or on a carrier material.

6. The device as claimed in claim 1, wherein the elements form an alloy.

7. The device as claimed in claim 1, wherein the elements are arranged in layers on top of one another.

8. The device as claimed in claim 1, wherein the elements are arranged adjacent to one another in at least one of a matrix shape, a comb shape and a meander shape.

9. The device as claimed in claim 1, wherein the device is embodied as plate-shaped or parallelepiped-shaped.

10. A calibration apparatus for energetic calibration of a photon-counting X-ray radiation detector, said calibration apparatus comprising:
a source of electrons or high-energy radiation; and
a device as claimed in claim 1.

11. An X-ray apparatus comprising:
a source of polychromatic X-ray radiation;
a photon-counting X-ray radiation detector; and
a device as claimed in claim 1, to energetically calibrate the photon-counting X-ray radiation detector.

12. A method for energetic calibration of a photon-counting X-ray radiation detector using a device including a plurality of specifically selected elements, each of the plurality of specifically selected elements, upon being irradiated with electrons or with high-energy radiation, emitting photons of X-ray fluorescence radiation of at least one specific or characteristic energy, the method comprising:
moving the device into a beam path of a source of electrons or high-energy radiation; and
using X-ray fluorescence radiation, originating from the device in the form of emitted photons of X-ray fluorescence radiation of specific or characteristic energies, for energetic calibration of the photon-counting X-ray radiation detector.

13. The device as claimed in claim 1, wherein the elements are present in at least one of powder form and as granulate.

14. The device as claimed in claim 2, wherein the elements are mixed with one another.

15. The device as claimed in claim 2, wherein the elements are at least one of pressed together and arranged in or on a carrier material.

16. The device as claimed in claim 2, wherein the elements form an alloy.

17. The device as claimed in claim 3, wherein the elements are arranged in layers on top of one another.

18. The device as claimed in claim 3, wherein the elements are arranged adjacent to one another in at least one of a matrix shape, a comb shape and a meander shape.

19. The device as claimed in claim 5, wherein the elements are arranged in layers on top of one another.

20. The device as claimed in claim 5, wherein the elements are arranged adjacent to one another in at least one of a matrix shape, a comb shape and a meander shape.

21. A calibration apparatus for energetic calibration of a photon-counting X-ray radiation detector, said calibration apparatus comprising:
a source of electrons or high-energy radiation; and
a device as claimed in claim 2.

22. The method as claimed in claim 12, wherein different ones
of the plurality of elements are selected such that the different specific or characteristic energies of the photons of X-ray fluorescence radiation emitted by the different elements are unequivocally distinguishable from one another.

* * * * *